US010031705B2

(12) United States Patent
Terada

(10) Patent No.: US 10,031,705 B2
(45) Date of Patent: Jul. 24, 2018

(54) IMAGE FORMING APPARATUS AND IMAGE FORMING METHOD WITH REAL TIME IMAGE QUALITY ADJUSTMENT FUNCTION

(71) Applicant: KONICA MINOLTA, INC., Chiyoda-ku, Tokyo (JP)

(72) Inventor: Kenji Terada, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/467,782

(22) Filed: Mar. 23, 2017

(65) Prior Publication Data

US 2017/0300274 A1  Oct. 19, 2017

(30) Foreign Application Priority Data

Apr. 19, 2016  (JP) ................................ 2016-083351

(51) Int. Cl.
 *G06F 3/12* (2006.01)

(52) U.S. Cl.
 CPC .......... *G06F 3/1208* (2013.01); *G06F 3/1231* (2013.01); *G06F 3/1254* (2013.01); *G06F 3/1263* (2013.01); *G06F 3/1296* (2013.01)

(58) Field of Classification Search
None
See application file for complete search history.

(56) References Cited

U.S. PATENT DOCUMENTS

2010/0302597 A1* 12/2010 Sugiyama .............. G06K 15/02
 358/3.27
2013/0243458 A1* 9/2013 Suzuki ............... G03G 15/5033
 399/49

FOREIGN PATENT DOCUMENTS

JP  2011197342 A  10/2011

* cited by examiner

*Primary Examiner* — Andrew H Lam
(74) *Attorney, Agent, or Firm* — Holtz, Holtz & Volek PC

(57) ABSTRACT

An image forming apparatus according to the present invention includes an image forming portion configured to form a pattern image for image quality adjustment in a marginal part other than an image forming region of a recording medium, a reading portion configured to read the pattern image for image quality adjustment formed on the recording medium, and a control portion configured to reflect a reading result by the reading portion on image quality adjustment and determine an execution order of jobs corresponding to presence/absence of the image quality adjustment set for each job.

12 Claims, 16 Drawing Sheets

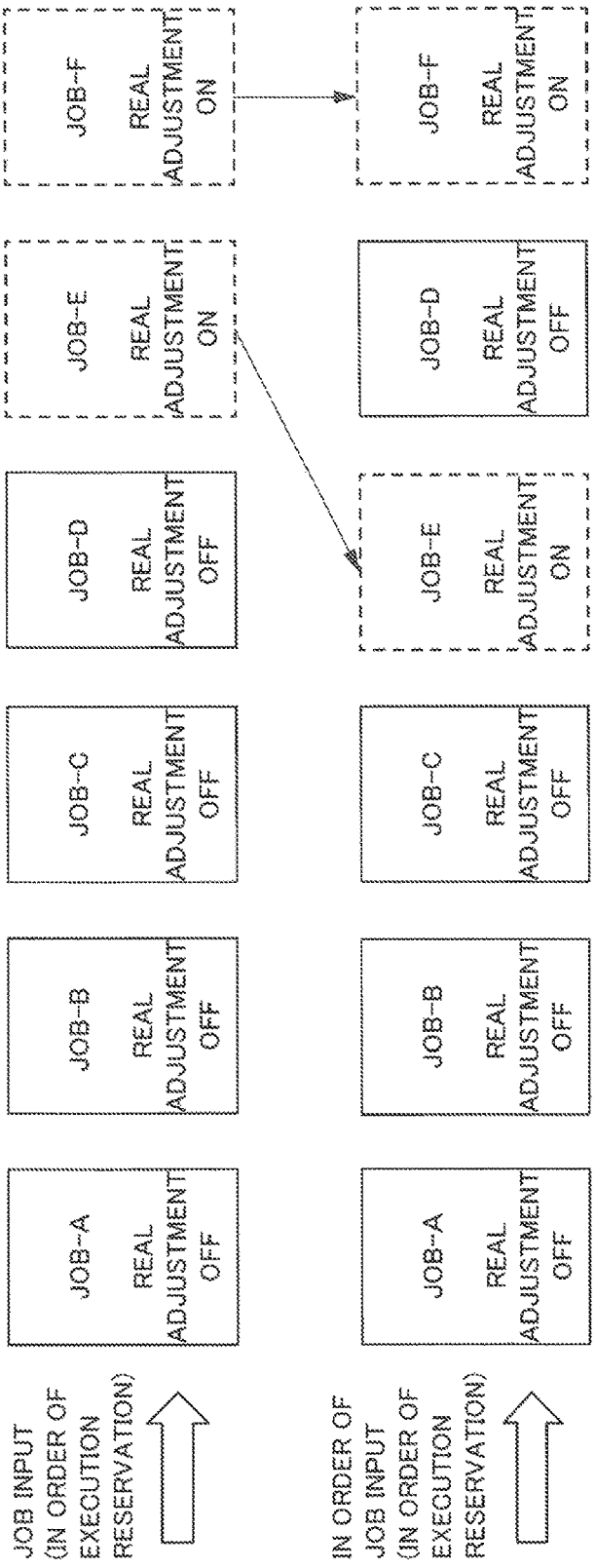

FIG. 6

[WHEN ADJUSTMENT IS EXECUTED WITHIN 150 SHEETS]

IN ORDER OF JOB INPUT (IN ORDER OF EXECUTION RESERVATION)

| JOB-A REAL ADJUSTMENT OFF [100 SHEETS] | JOB-B REAL ADJUSTMENT OFF [60 SHEETS] | JOB-C REAL ADJUSTMENT OFF [70 SHEETS] | JOB-D REAL ADJUSTMENT OFF [50 SHEETS] | JOB-E REAL ADJUSTMENT ON [100 SHEETS] | JOB-F REAL ADJUSTMENT ON [50 SHEETS] |

IN ORDER OF JOB INPUT (IN ORDER OF EXECUTION RESERVATION)
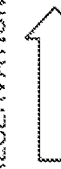

| JOB-A REAL ADJUSTMENT OFF [100 SHEETS] | JOB-E REAL ADJUSTMENT ON [100 SHEETS] | JOB-B REAL ADJUSTMENT OFF [60 SHEETS] | JOB-C REAL ADJUSTMENT OFF [70 SHEETS] | JOB-F REAL ADJUSTMENT ON [50 SHEETS] | JOB-D REAL ADJUSTMENT OFF [50 SHEETS] |

· EXECUTION ORDER OF JOB INCLUDING ADJUSTMENT IS SET AHEAD SO THAT ADJUSTMENT CAN BE EXECUTED WITHIN DESIGNATED RANGE (NUMBER-OF-SHEETS UNIT).

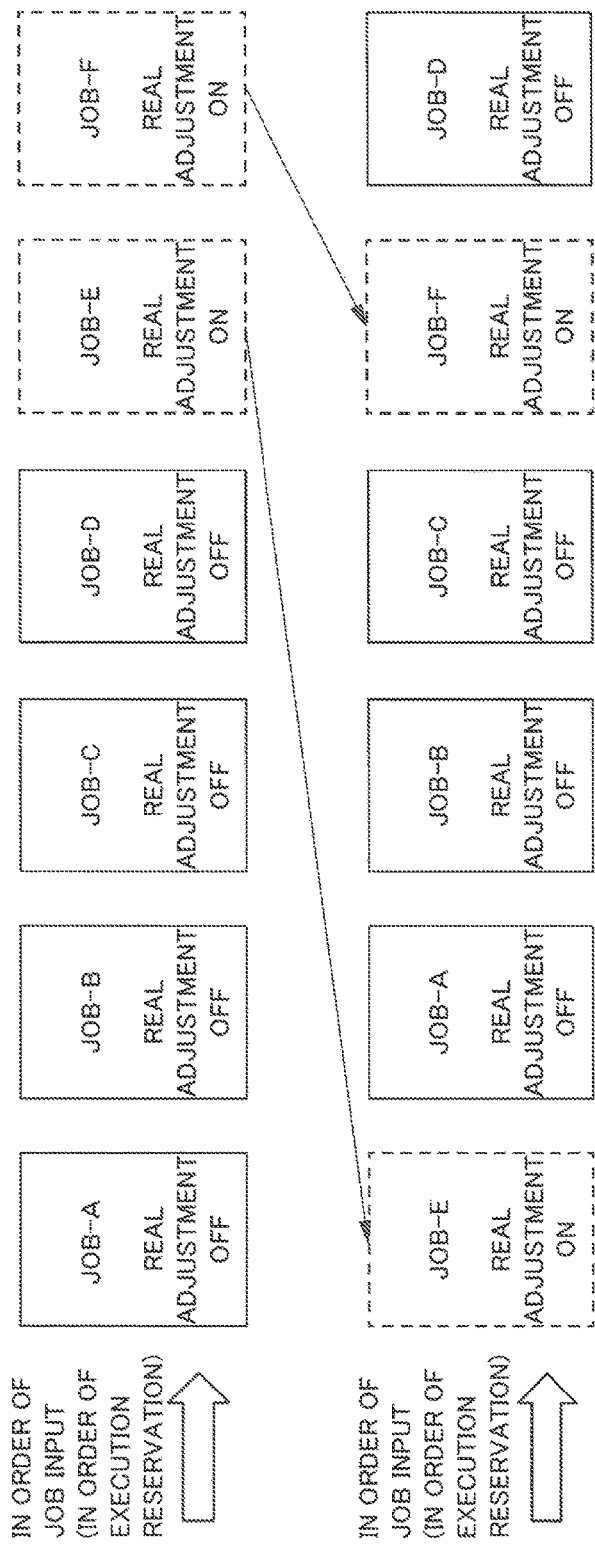

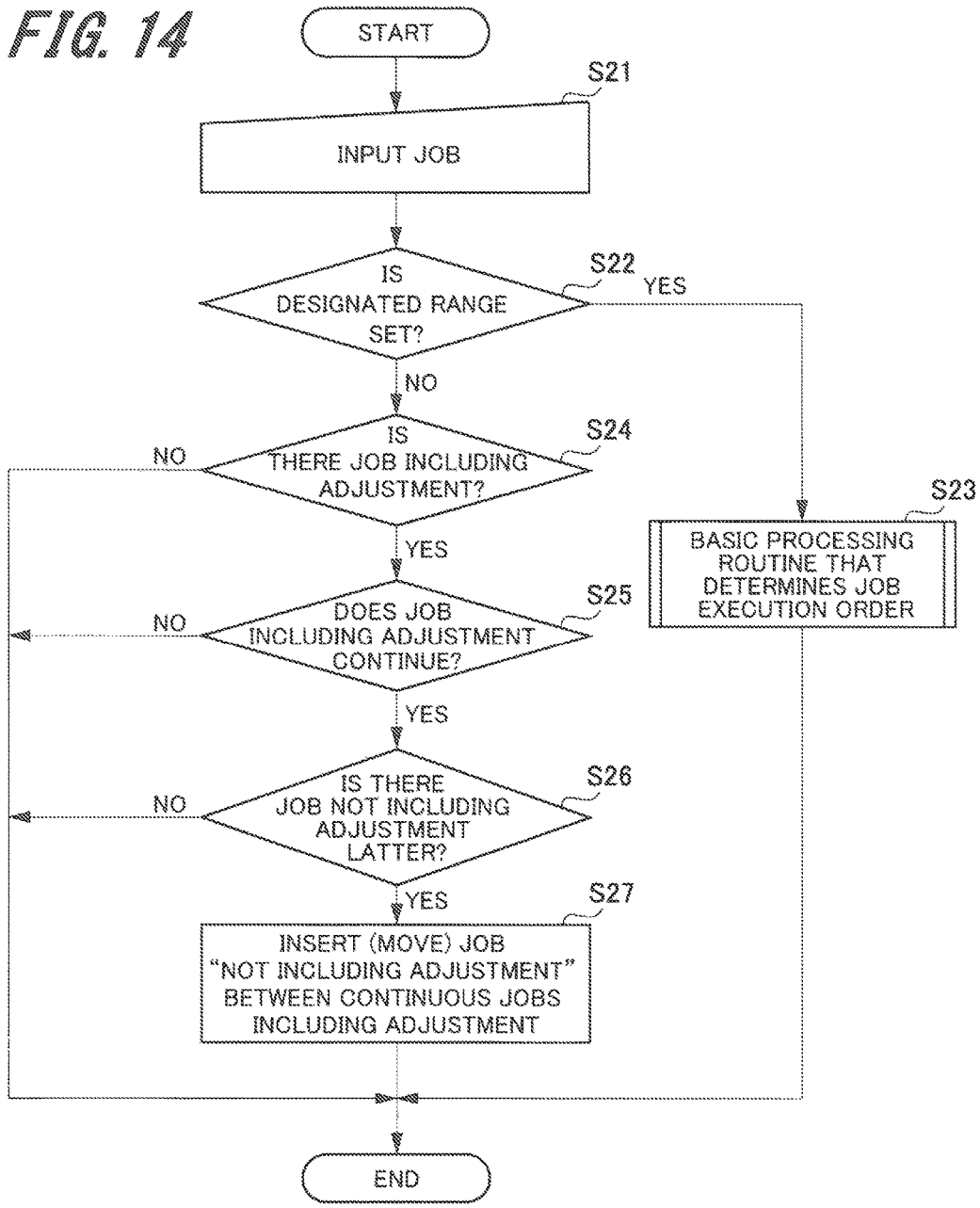

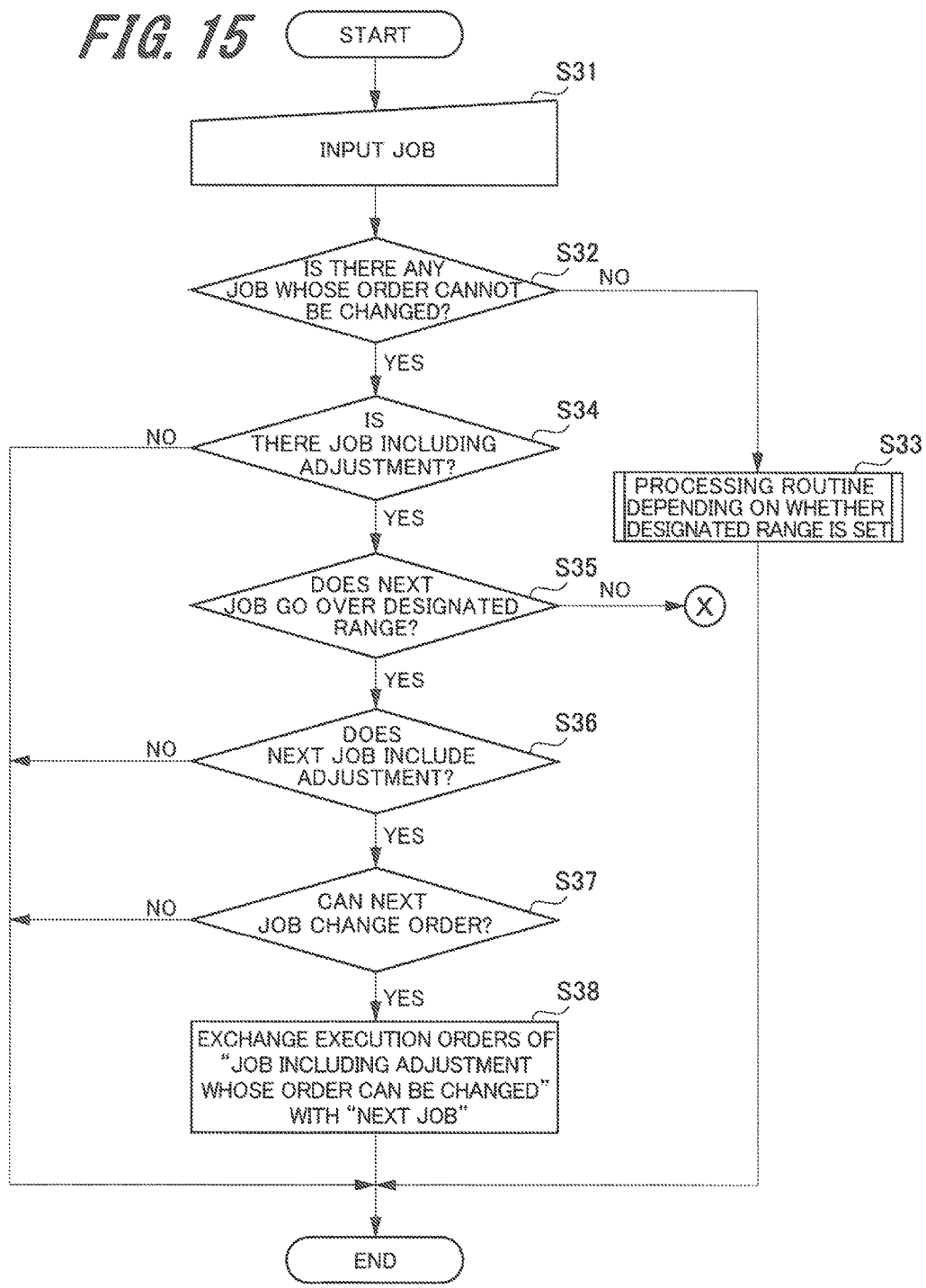

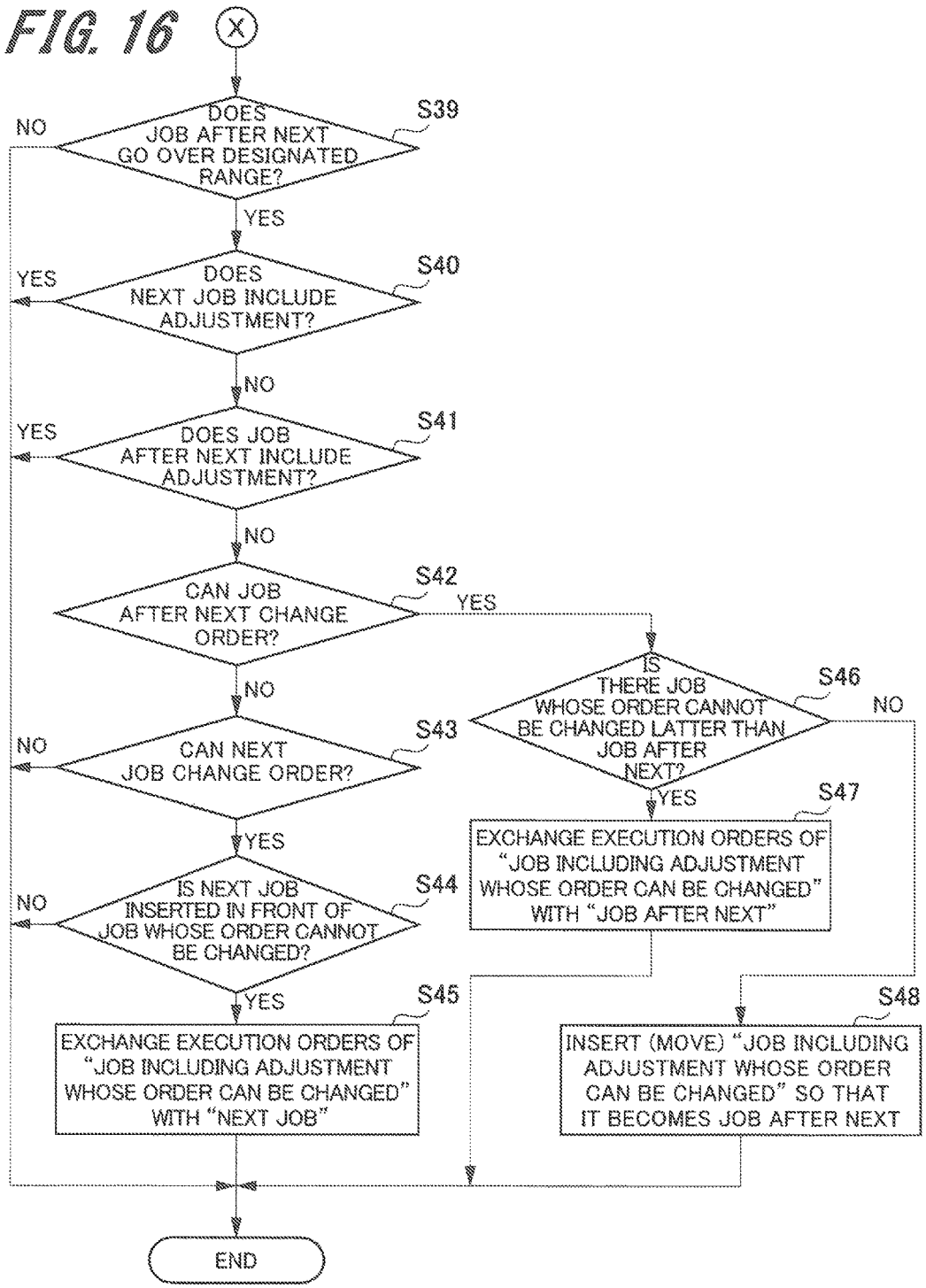

IMAGE FORMING APPARATUS AND IMAGE FORMING METHOD WITH REAL TIME IMAGE QUALITY ADJUSTMENT FUNCTION

BACKGROUND OF THE INVENTION

Field of the Invention

The present invention relates to an image forming apparatus and an image forming method and, particularly, to an image forming apparatus and an image forming method of an electrophotographic system.

Description of the Related Art

An image forming apparatus of an electrophotographic system has a feature in which an image is formed by use of static electricity. Therefore, due to fluctuation of environmental conditions such as temperature and humidity of an environment where the present apparatus is used, and deterioration of photoreceptor and developer over time, in other words, change of durability thereof, density of an image, width of lines, and a printing position fluctuate. Thus, there is a case where an image having stable image quality may not be formed.

Therefore, the image forming apparatus is provided with an image quality adjustment function that forms a pattern image for image quality adjustment in a marginal part other than an image forming region of a recording medium, reads the pattern image by a sensor, and adjusts the image quality based on its reading result (refer to Japanese Patent Laid-Open No. 2011-197342, e.g.). Herein, the pattern image for image quality adjustment is a pattern image that is formed exclusively for the image quality adjustment.

SUMMARY OF THE INVENTION

ON/OFF (presence/absence) of an image quality adjustment function described above is designated by a user for each job that forms the image. However, even the image quality adjustment function ON is designated, a job does not execute the image quality adjustment function on a recording medium having no marginal part where the pattern image for image quality adjustment is to be formed. Therefore, there can be a job of the image quality adjustment function ON (the image quality adjustment is performed) and a job of the image quality adjustment function OFF (the image quality adjustment is not performed).

Further, when the job of the image quality adjustment function ON and the job of the image quality adjustment function OFF are performed simply in an order of user's input, the jobs of the image quality adjustment function OFF may continue. In this case, since the image quality adjustment is not performed over a long period, the image quality may be deteriorated in an image formed based on latter jobs. To solve the problem, when the image quality adjustment is not performed over a predetermined period, the image quality adjustment can be forcibly performed. However, since the job needs to be once stopped to execute the image quality adjustment, productivity can be lowered.

The present invention is conducted considering the above described state. A purpose of the present invention is to provide the image forming apparatus and image forming method that can prevent the image quality from deterioration without the image quality adjustment forcibly performed.

In order to achieve the above described purpose, an image forming apparatus reflecting one aspect of the present invention includes: an image forming portion configured to form a pattern image for image quality adjustment in a marginal part other than an image forming region of a recording medium; a reading portion configured to read the pattern image for image quality adjustment formed on the recording medium; and a control portion configured to reflect a reading result by the reading portion on image quality adjustment and determine an execution order of jobs corresponding to presence/absence of the image quality adjustment set for each job, and executes a reserved job for which the presence/absence of the image quality adjustment is designated.

Moreover, an image forming method reflecting one aspect of the present invention includes: forming a pattern image for image quality adjustment in a marginal part other than an image forming region of a recording medium; reading the pattern image for image quality adjustment formed on the recording medium; and reflecting a reading result of the pattern image for image quality adjustment to image quality adjustment; and determining an execution order of jobs corresponding to presence/absence of the image quality adjustment set for each job, and executes a reserved job for which the presence/absence of image quality adjustment is designated.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 illustrates a change of an execution order of jobs according to Embodiment 1.

FIG. 6 illustrates a change of an execution order of jobs according to Embodiment 2.

FIG. 7 illustrates a change of an execution order of jobs according to Embodiment 3.

FIG. 14 is a flowchart illustrating a processing flow according to a control example 2.

FIG. 15 is a flowchart (1) illustrating a processing flow according to a control example 3.

FIG. 16 is a flowchart (2) illustrating a processing flow according to a control example 3.

DESCRIPTION OF THE PREFERRED EMBODIMENTS

Hereinafter, an embodiment of the present invention will be described with reference to the drawings. However, the scope of the invention is not limited to the illustrated examples.

Modes for embodying the present invention (described as "embodiments" below) will be described in detail below by use of the drawings. The present invention is not limited to the embodiments, and various numeral values in the embodiments are examples. Note that, a same reference symbol is used for same elements or elements having same functions in the following description and in each of the drawings, and descriptions are not repeated.

[Image Forming System to which the Present Invention is Applied]

Figure 1:
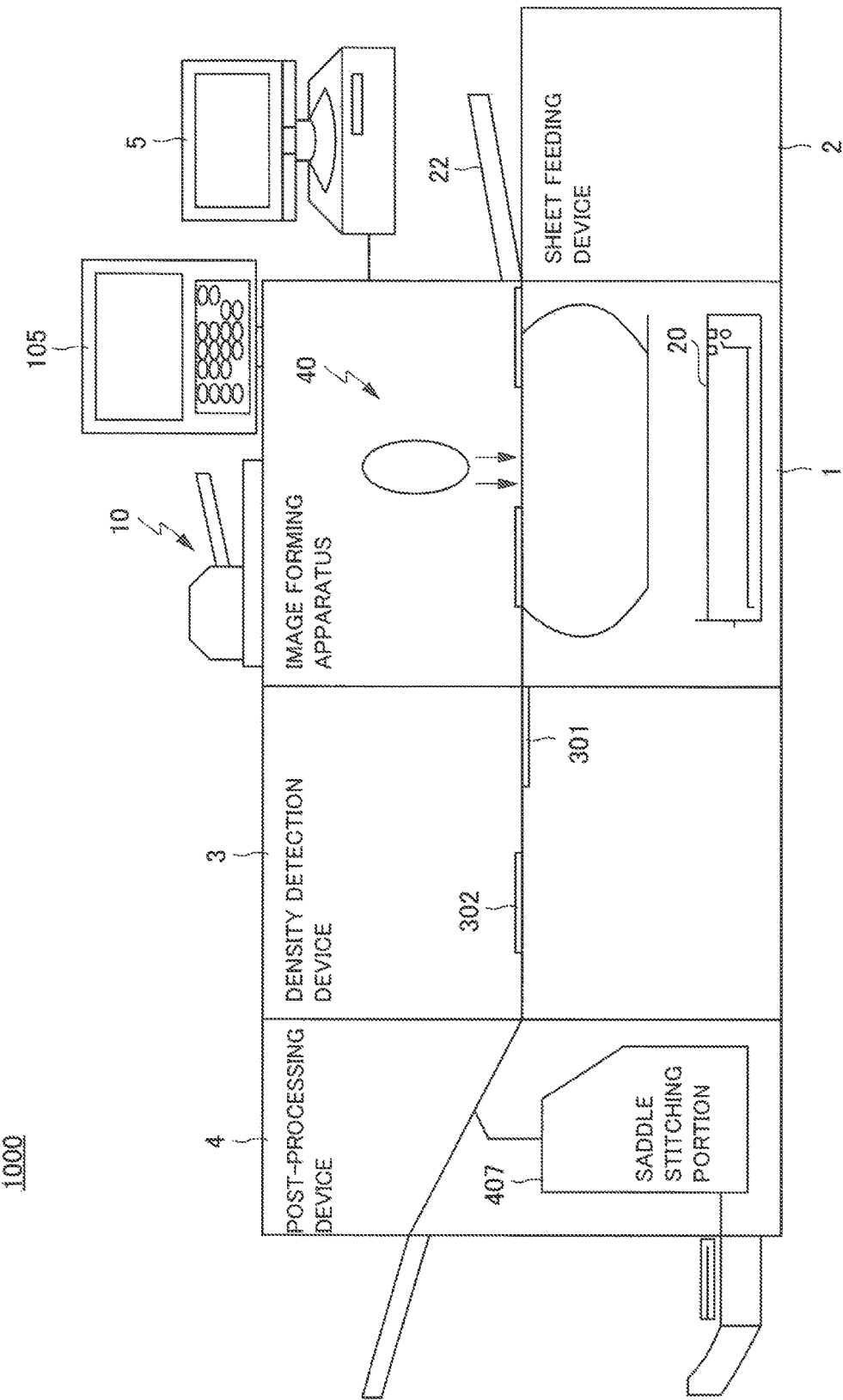
FIG. 1 is a system configuration diagram illustrating a schematic configuration of an image forming system to which the present invention is applied.

FIG. 1 is a system configuration diagram illustrating a schematic configuration of an image forming system to which the present invention is applied. As illustrated in FIG. 1, an image forming system 1000 according to the present embodiment includes an image forming apparatus 1, a sheet feeding device 2, a density detection device 3, a post-processing device 4, and an external device 5. The image forming apparatus 1 is an image forming apparatus of the present invention, and details about the configuration and the like will be described below.

The sheet feeding device 2 is included separately from a sheet accommodating portion 20 built in the image forming apparatus 1, and is a large-capacity sheet-feeding device that supplies various types of recording media to the image forming apparatus 1. The density detection device 3 detects toner density of an image formed on a recording medium conveyed from the image forming apparatus 1 after the image is formed by the image forming apparatus 1. The density detection device 3 includes a first density sensor 301 that reads the density on a first face of the recording medium from a lower side thereof, for example, and a second density sensor 302 that reads the density on a second face of the recording medium from an upper side thereof, for example. Herein, although the first density sensor 301 and the second density sensor 302 of the density detection device 3 are provided outside the image forming apparatus 1, they also can be provided inside the image forming apparatus 1.

The post-processing device 4 performs post-processing such as staple processing on the recording medium output from the image forming apparatus 1 via the density detection device 3. The post-processing device 4 includes, as an example, a saddle stitching portion 407 that staples a half-folded recording medium (printed matter) in an open state along a center folding line. The external device 5 includes a personal computer (PC), for example, and supplies image data to the image forming apparatus 1. Herein, as the external device 5, the PC is described as an example, but the external device 5 is not limited to the PC. For example, other various types of devices such as a facsimile device can be applied as the external device 5.

(Configuration Example of Image Forming Apparatus)

Figure 2:
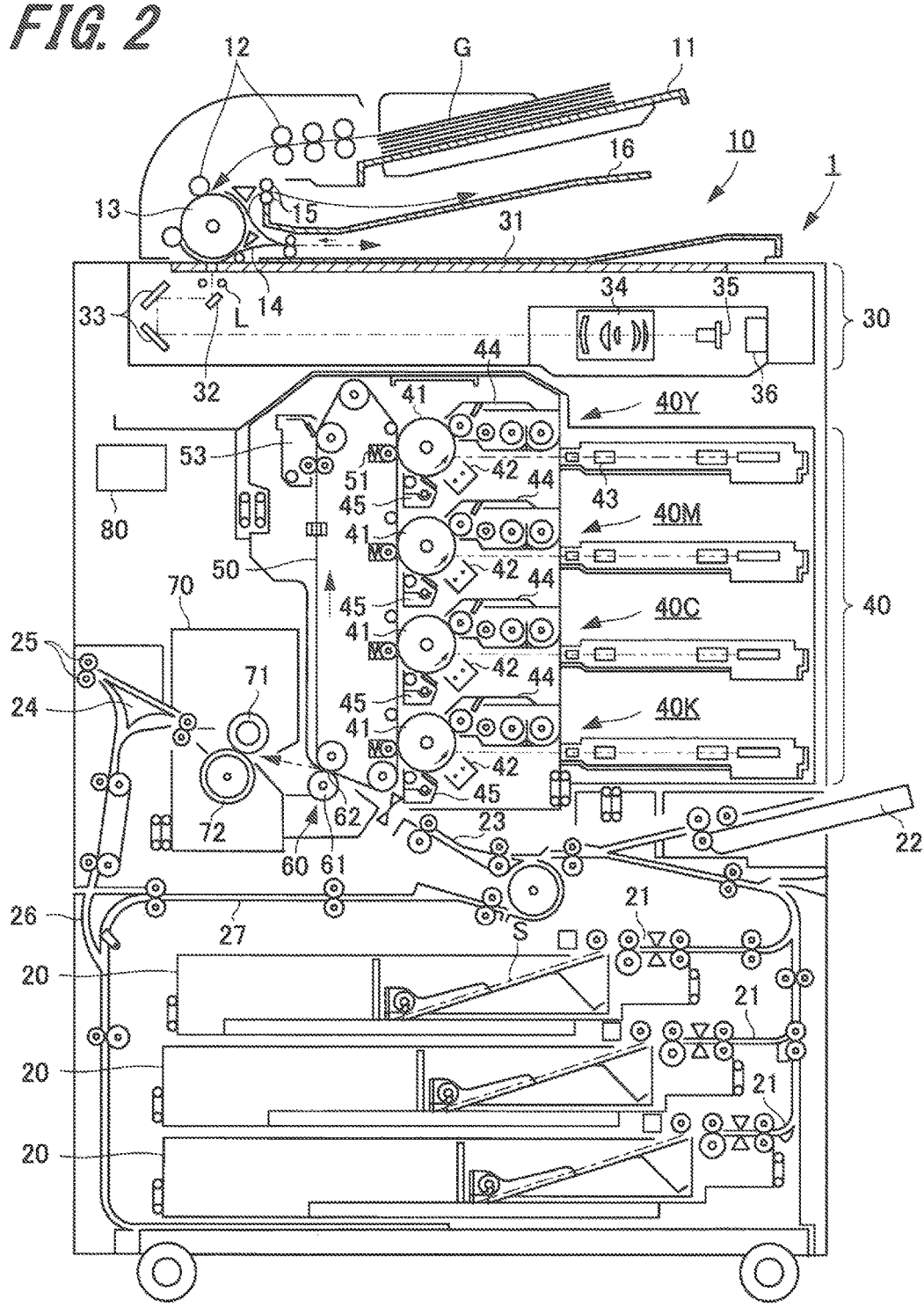
FIG. 2 is a total configuration diagram illustrating a schematic system configuration of an image forming apparatus according to an embodiment of the present invention.

FIG. 2 is a total configuration diagram illustrating a schematic system configuration of an image forming apparatus according to an embodiment of the present invention. According to the present embodiment, a case where the image forming apparatus is applied to a copy machine is exemplified.

As illustrated in FIG. 2, the image forming apparatus 1 according to the present embodiment adopts the electrophotographic system that forms an image on a recording medium S such as a sheet using static electricity. The image forming apparatus 1 is a color image forming apparatus of a tandem format where four-color toner of yellow (Y), magenta (M), cyan (C), and black (K) are overlapped with each other.

The image forming apparatus 1 according to the present embodiment includes a document conveyance portion 10, the sheet accommodating portion 20, an image reading portion 30, an image forming portion 40, an intermediate transfer belt 50, a secondary transfer portion 60, a fixing portion 70, and a control substrate 80.

The document conveyance portion 10 includes a document feeding table 11 on which a document G is set, a plurality of rollers 12, a conveyance drum 13, a conveyance guide 14, a document ejecting roller 15, and a document receiving tray 16. The document G set on the document feeding table 11 is conveyed one by one to a reading position of the image reading portion 30 by the plurality of rollers 12 and the conveyance drum 13. The conveyance guide 14 and the document ejecting roller 15 eject the document G conveyed by the plurality of rollers 12 and the conveyance drum 13 onto the document receiving tray 16.

The sheet accommodating portion 20 is arranged at a lower part of a main body of the image forming apparatus, and accommodate the recording medium S. A plurality of the sheet accommodating portions 20 is provided depending on a size and a type of the recording medium S. The recording medium S accommodated in the sheet accommodating portion 20 is fed and sent to a conveyance portion 23 by a sheet feeding portion 21, and conveyed by the conveyance portion 23 to the secondary transfer portion 60 that is a transfer position. Further, near the sheet accommodating portion 20, a manual insertion portion 22 is provided. The user sets, in the manual insertion portion 22, special recording media such as sheets having a size not accommodated in the sheet accommodating portions 20, tag sheets having tags, and OHP sheets. Then, the recording medium set in the manual insertion portion 22 are fed to the transfer position by the conveyance portion 23.

The image reading portion 30 reads an image of the document G conveyed by the document conveyance portion 10 or an image of the document G placed on a document platen 31, and generates image data. Specifically, the image of the document G is irradiated with a lamp L. Reflection light from the document G based on irradiation light from the lamp L is guided in order of a first mirror unit 32, a second mirror unit 33, and a lens unit 34, and forms an image on a light-receiving face of an imaging element 35. The imaging element 35 performs photoelectric conversion on incident light to output a predetermined image signal. The image signal output from the imaging element 35 is A/D-converted to thereby create the image data.

Further, the image reading portion 30 includes an image reading control portion 36. The image reading control portion 36 performs known image processing such as shading correction, dither processing, and compression on the image data generated by the A/D conversion, and stores the image data in RAM (not illustrated) mounted in the control substrate 80. Note that, the image data is not limited to the data output from the image reading portion 30, and may be data received from the external device 5 connected to the image forming apparatus 1.

The image forming portion 40 and the intermediate transfer belt 50 that is an image carrier are arranged between the sheet accommodating portion 20 and the image reading portion 30. The image forming portion 40 has four of first to fourth image forming units 40Y, 40M, 40C, 40K for forming a toner image of yellow (Y), a toner image of magenta (M), a toner image of cyan (C), and a toner image of black (K).

The first image forming unit 40Y forms a toner image of yellow, and the second image forming unit 40M forms a toner image of magenta. Further, the third image forming unit 40C forms a toner image of cyan, and the fourth image forming unit 40K forms a toner image of black. The four image forming units 40Y, 40M, 40C, 40K have same configurations. Therefore, the first image forming unit 40Y will be described here.

The first image forming unit 40Y includes a photoreceptor (photoreceptor drum) 41 in a drum-like shape that is the image carrier, and a charging portion 42 arranged around the photoreceptor 41, an exposure portion 43, a development portion 44, and a cleaning portion 45. The photoreceptor 41 is rotated under drive by a drive motor (not illustrated). The charging portion 42 uniformly charges a surface of the photoreceptor 41 by giving charge to the photoreceptor 41. The exposure portion 43 performs exposure with a laser beam, for example, on the surface of the photoreceptor 41 based on the image data read from the document G or the image data transmitted from the external device 5 so as to form an electrostatic latent image on the photoreceptor 41.

The development portion 44 uses developer including two components of toner and carrier to develop the electrostatic latent image formed on the photoreceptor 41. The toner includes particles forming the image. The carrier has a function that gives appropriate charge to the toner with friction charge when the carrier is mixed with the toner in the development portion 44, a function that conveys the toner to a development region facing the photoreceptor 41, and a function that forms a development electric field so that the toner can be faithfully developed on the electrostatic latent image on the photoreceptor 41. The development portion 44 includes a development sleeve 46 that supplies the developer to the photoreceptor 41. The development portion 44 makes the yellow toner adhere onto the electrostatic latent image formed on the photoreceptor 41. With this arrangement, the toner image of yellow is formed on the surface of the photoreceptor 41.

Note that, the development portion 44 of the second image forming unit 40M makes the magenta toner adhere onto the photoreceptor 41. The development portion 44 of the third image forming unit 40C makes the cyan toner adhere onto the photoreceptor 41. Further, the development portion 44 of the fourth image forming unit 40K makes the black toner adhere onto the photoreceptor 41.

The cleaning portion 45 removes the toner remaining on the surface of the photoreceptor 41.

The toner adhering onto the photoreceptor 41 is transferred to the intermediate transfer belt 50. The intermediate transfer belt 50 is formed endlessly, and hung over the plurality of rollers. The intermediate transfer belt 50 is rotated in an opposite direction of a rotation (movement) direction of the photoreceptor 41 under drive of the drive motor (not illustrated).

In the intermediate transfer belt 50, four primary transfer portions 51 are arranged at positions facing the respective photoreceptors 41 of the four image forming units 40Y, 40M, 40C, 40K. The primary transfer portion 51 transfers the toner adhering onto the photoreceptor 41 to the intermediate transfer belt 50 by applying a voltage having a polarity opposite to that of toner to the intermediate transfer belt 50.

Then, the intermediate transfer belt 50 is rotated and, accordingly, the toner images formed by four image forming units 40Y, 40M, 40C, 40K are sequentially transferred onto the surface of the intermediate transfer belt 50. With this arrangement, a toner image of yellow, a toner image of magenta, a toner image of cyan, and a toner image of black are overlapped with each other to form a color image on the intermediate transfer belt 50.

Further, a belt cleaning device 53 is provided in a state facing the intermediate transfer belt 50. The belt cleaning device 53 cleans the surface of the intermediate transfer belt 50 on which the toner image has been transferred onto the recording medium S.

The secondary transfer portion 60 is arranged near the intermediate transfer belt 50 and at a downstream of the conveyance portion 23 in a sheet conveyance direction. The secondary transfer portion 60 makes the recording medium S conveyed by the conveyance portion 23 come into contact with the intermediate transfer belt 50 to transfer the toner image formed on a circumferential surface of the intermediate transfer belt 50 onto the recording medium S.

The secondary transfer portion 60 includes a secondary transfer roller 61. The secondary transfer roller 61 is provided in a state pressure-contacted with a facing roller. Further, a part where the secondary transfer roller 61 and the intermediate transfer belt 50 come into contact with each other is a secondary transfer nip portion 62. A position of the secondary transfer nip portion 62 is a transfer position where the toner image formed on the circumferential surface of the intermediate transfer belt 50 is to be transferred onto the recording medium S.

The fixing portion 70 is provided at an ejection side of the recording medium S in the secondary transfer portion 60. The fixing portion 70 pressurizes and heats the recording medium S to fix on the recording medium S the toner image transferred to the recording medium S. The fixing portion 70 includes a fixing upper roller 71 and a fixing lower roller 72 that are a pair of fixing members, for example. The fixing upper roller 71 and the fixing lower roller 72 are arranged in a state pressure-contacted with each other, and a fixing nip portion is formed as a pressure-contact portion between the fixing upper roller 71 and the fixing lower roller 72.

A heating portion is provided inside the fixing upper roller 71. With radiation heat from the heating portion, a roller portion of the fixing upper roller 71 is warmed. Then, the heat of the roller portion of the fixing upper roller 71 is transferred to the recording medium S to fix the toner image on the recording medium S.

The recording medium S is conveyed such that a face (a face on which the toner image is to be fixed) on which the toner image is transferred by the secondary transfer portion 60 faces the fixing upper roller 71, and passes the fixing nip portion. Therefore, the recording medium S passing the fixing nip portion is pressurized by the fixing upper roller 71 and the fixing lower roller 72, and heated with heat of the roller portion of the fixing upper roller 71.

A switch gate 24 is arranged at the downstream of the fixing portion 70 in the conveyance direction of the recording medium S. The switch gate 24 switches a conveyance path of the recording medium S having passed the fixing portion 70. Specifically, in a case of ejecting the sheet with the image side facing up when the image is formed on one face of the recording medium S, the switch gate 24 makes the recording medium S advance straight. With this arrangement, the recording medium S is ejected by a pair of sheet ejection rollers 25. Further, in a case of ejecting the sheet with the image side facing down when the image is formed on one face of the recording medium S, and in a case of forming the image on both faces thereof, the switch gate 24 guides the recording medium S downward.

In a case of ejecting the sheet with the image side facing down, the switch gate 24 guides the recording medium S downward, and then a sheet reverse and conveyance portion 26 conveys the recording medium S upward with its front and back faces reversed. With this arrangement, the recording medium S with its front and back faces reversed is ejected by the pair of sheet ejection rollers 25. In a case of forming the images on both faces of the recording medium S, the switch gate 24 guides the recording medium S downward, and then the sheet reverse and conveyance portion 26 reverses the front and back faces of the recording medium. S to each other. Then, the recording medium S with its front and back faces reversed to each other is fed again to the transfer position via a sheet re-feeding path 27.

[Hardware Configuration of Each Portion of Image Forming System]

Figure 3:
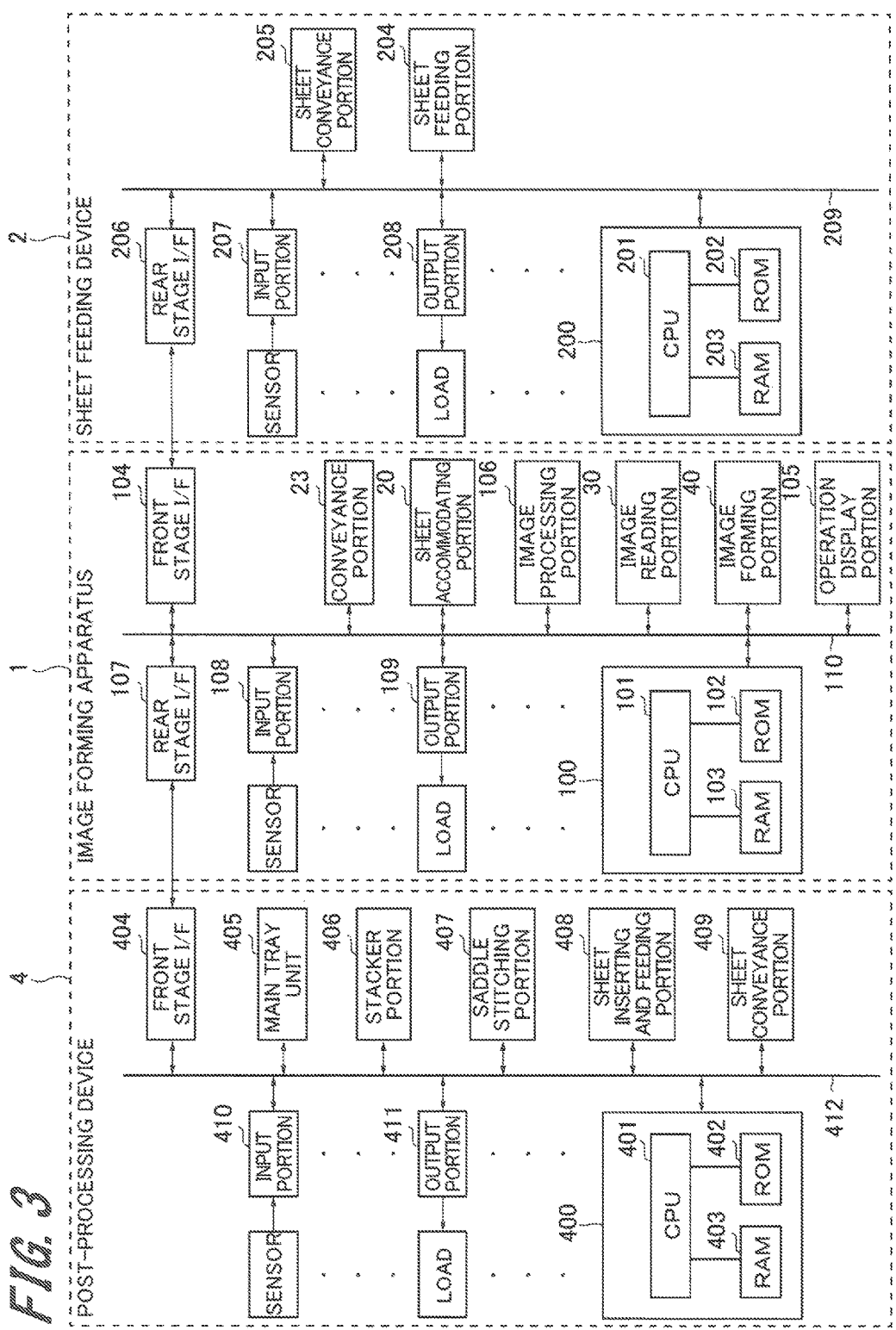
FIG. 3 is a block diagram illustrating an example of a hardware configuration of each portion of the image forming system to which the present invention is applied.

Subsequently, a hardware configuration of each portion of the image forming system 1000 will be described with reference to FIG. 3. FIG. 3 is a block diagram illustrating an example of a hardware configuration of each portion of the image forming system 1000. To make the drawing simple, illustration of the hardware configuration of the density detection device 3 in FIG. 1 is omitted in FIG. 3.

[Hardware Configuration of Image Forming Apparatus]

First, a hardware configuration of the image forming apparatus 1 according to the present embodiment will be described. As illustrated in FIG. 3, the image forming apparatus 1 includes a control portion 100 in addition to the sheet accommodating portion 20, the conveyance portion 23, the image reading portion 30, and the image forming portion 40, as described above.

The control portion 100 is configured on the control substrate 80 illustrated in FIG. 2. The control portion 100 includes a CPU (central processing unit) 101, a ROM (read only memory) 102 that stores a program and the like executed by CPU 101, and a RAM (random access memory) 103 used as a work area of the CPU 101, for example. The control portion 100 controls a total action of the image forming apparatus 1 under control of the CPU 101.

The image forming apparatus 1 further includes a front stage I/F (interface) 104, an operation display portion 105, an image processing portion 106, a rear stage I/F 107, an input portion 108, and an output portion 109. The CPU 101 of the control portion 100 is connected with the sheet accommodating portion 20, the conveyance portion 23, the image reading portion 30, the image forming portion 40, the front stage I/F 104, the operation display portion 105, the image processing portion 106, the rear stage I/F 107, the input portion 108, and the output portion 109 via a bus line 110.

The front stage I/F 104 is an interface between the image forming apparatus 1 and the sheet feeding device 2 that is a device provided at a front stage of the image forming apparatus 1. The operation display portion 105 is a touch panel including a display such as a liquid crystal display device (LCD) or an organic EL (electro luminescence) display device. The operation display portion 105 displays information about an instruction menu for the user and the image data obtained. The operation display portion 105 further includes a plurality of keys, and receives input of data including various types of instructions, characters, numerals, and the like, by a user's key operation, and outputs them to the control portion 100.

The image data generated by the image reading portion 30 and the image data transmitted from the external device 5 (refer to FIG. 1) are transmitted to the image processing portion 106. The image processing portion 106 includes the image reading control portion 36 of the image reading portion 30 described above, and performs image processing such as analog processing, A/D conversion, shading correction, and image compression on the image data received.

The rear stage I/F 107 is an interface between the image forming apparatus 1 and the post-processing device 4 that is a device provided at a rear stage of the image forming apparatus 1. The input portion 108 takes in an output signal of each sensor provided in the image forming apparatus 1, and supplies the output signal to the control portion 100 via the bus line 110. The output portion 109 outputs a control signal supplied from the control portion 100 via the bus line 110 to each load provided in the image forming apparatus 1.

[Hardware Configuration of Sheet Feeding Device]

Subsequently, the hardware configuration of the sheet feeding device 2 will be described. As illustrated in FIG. 3, the sheet feeding device 2 includes a control portion 200. In a similar manner to the control portion 100 of the image forming apparatus 1, the control portion 200 includes a CPU 201, a ROM 202 that stores programs and the like executed by the CPU 201, and a RAM 203 used as a work area of the CPU 201, for example. The control portion 200 controls a total action of the sheet feeding device 2 under control of the CPU 201.

In addition to the control portion 200, the sheet feeding device 2 includes a sheet feeding portion 204, a sheet conveyance portion 205, a rear stage I/F 206, an input portion 207, and an output portion 208, for example. The CPU 201 of the control portion 200 is connected with the sheet feeding portion 204, the sheet conveyance portion 205, the rear stage I/F 206, the input portion 207, and the output portion 208 via a bus line 209.

The sheet feeding portion 204 supplies the recording medium (sheet) to the image forming apparatus 1. The sheet conveyance portion 205 conveys the recording medium supplied from the sheet feeding portion 204 to the image forming apparatus 1. The rear stage I/F 206 is an interface between the sheet feeding device 2 and the image forming apparatus 1 that is an apparatus of the rear stage of the sheet feeding device 2.

The input portion 207 takes in the output signal of each sensor provided in the sheet feeding device 2, and supplies the output signal to the control portion 200 via the bus line 209. The output portion 208 outputs the control signal supplied from the control portion 200 via the bus line 209 to each load provided in the sheet feeding device 2.

[Hardware Configuration of Post Processing Device]

Finally, the hardware configuration of the post-processing device 4 will be described. As illustrated in FIG. 3, the post-processing device 4 includes a control portion 400. In a similar manner to the control portion 100 of the image forming apparatus 1, the control portion 400 includes a CPU 401, a ROM 402 that stores programs and the like executed by the CPU 401, and a RAM 403 used as a work area of the CPU 401, for example. The control portion 400 controls a total action of the post-processing device 4 under control of the CPU 401.

In addition to the control portion 400, the post-processing device 4 includes a front stage I/F 404, a main tray unit 405, a stacker portion 406, the saddle stitching portion 407, a sheet inserting and feeding portion 408, a sheet conveyance portion 409, an input portion 410, and an output portion 411, for example. The CPU 401 of the control portion 400 is connected with the front stage I/F 404, the main tray unit 405, the stacker portion 406, the saddle stitching portion 407, the sheet inserting and feeding portion 408, the sheet conveyance portion 409, the input portion 410, and the output portion 411 via a bus line 412.

In other words, the front stage I/F 404, the main tray unit 405, the stacker portion 406, the saddle stitching portion 407, the sheet inserting and feeding portion 408, the sheet conveyance portion 409, the input portion 410, and the output portion 411 perform each function under control of the CPU 401 of the control portion 400. The front stage I/F 404 is an interface between the post-processing device 4 and the image forming apparatus 1 that is the apparatus provided at the front stage of the post-processing device 4. Each function of the main tray unit 405, the stacker portion 406, the saddle stitching portion 407, the sheet inserting and feeding portion 408, and the sheet conveyance portion 409 is a general known function, and thus the description thereof will be omitted.

The input portion 410 takes in the output signal of each sensor provided in the post-processing device 4, and supplies the output signal to the control portion 400 via the bus line 412. The output portion 411 outputs a control signal supplied from the control portion 400 via the bus line 412 to each load provided in the post-processing device 4.

[Image Quality Adjustment Function]

Incidentally, the image forming apparatus of the electrophotographic system generally has an image quality adjustment function for the purpose of forming images having stable image quality without receiving impact of fluctuation of environmental conditions including temperature, humidity, and the like in usage environment, and aging deterioration of photoreceptor, developer, and the like, in other words, change of durability. The image forming apparatus 1 according to the present embodiment has a function of real time adjustment (hereinafter, simply described as "real adjustment") of performing the image quality adjustment in real time when the image is formed, as the image quality adjustment function.

Figure 4:
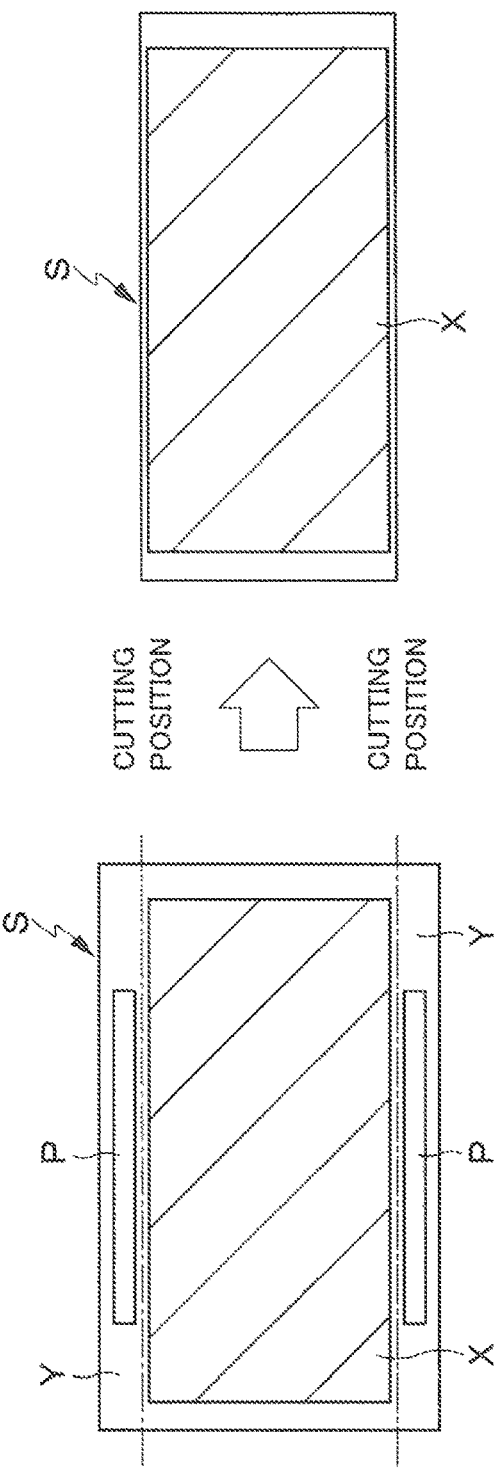
FIG. 4 illustrates relationship between a marginal part other than an image forming region of a recording medium and a pattern image for image quality adjustment.

As illustrated in FIG. 4, the real adjustment function forms a pattern image P for image quality adjustment in a marginal part Y other than an image forming region X of the recording medium S having a larger size than the document G, reads the pattern image P for image quality adjustment by the first density sensor 301 and the second density sensor 302, and adjusts the image quality in real time based on the result of reading. In the recording medium S after the image is formed, the marginal part Y other than the image forming region X is cut and output by the post-processing device 4 at a cutting position indicated with broken lines in FIG. 4.

The real adjustment is performed by feeding back the reading result of the pattern image P for image quality adjustment by the first density sensor 301 and the second density sensor 302 to conditions for the image forming portion 40 to form the image (hereinafter, described as "image forming conditions"), and reflecting the feedback on density adjustment and position adjustment of the image. Examples of the image forming conditions include charge voltage, an amount of exposure, and development bias voltage. Herein, the "pattern image P for image quality adjustment" is a pattern image referred to as an adjustment patch image exclusively formed by the image forming portion 40 for the image quality adjustment.

Examples of the adjustment patch image include register marks that adjust a position of the image, and a gradation patch for adjusting density thereof. In order to form the pattern image P for image quality adjustment in the marginal part Y other than an image forming region X of the recording medium S, a region necessary as the marginal part Y is larger for the gradation patch than for the register marks. Therefore, for patterns of the adjustment patch image formed in the marginal part Y depending on a size of the region, only the register marks or the register marks and the gradation patch will be formed. With this arrangement, in the real adjustment, as the pattern image P for image quality adjustment, when only the register marks are formed, only the position adjustment is performed. When the register marks and the gradation patch are formed, the position adjustment and density adjustment are performed.

Note that, also when the recording medium S does not include the marginal part Y having a size enough to form the pattern image P for image quality adjustment, it is possible to perform setting in which the pattern image P for image quality adjustment is formed by user's designation. This setting can be performed, even when it is determined that there is no enough marginal part Y due to a size of a transfer sheet and a size of the image forming region X, but still when there is a large blank part in a top part and a bottom part of an actual image, and further when a region including the image forming region X can be cut offline, for example.

The user designates whether or not to perform the above described real adjustment, in other words, the real adjustment function ON/OFF (presence/absence) for each job forming the image. More specifically, the user can designate any of "real adjustment ON (forming the pattern image P for image quality adjustment when there is the marginal part Y)", "real adjustment ON (forming the pattern image P for image quality adjustment regardless of the marginal part Y)", and "real adjustment OFF".

Further, while the job of the real adjustment ON (job including the image quality adjustment) and the job of the real adjustment OFF (job including no image quality adjustment) are mixedly output, the image forming apparatus 1 according to the present embodiment can determine presence/absence of execution of the real adjustment on a reserved job in advance. Then, the image forming apparatus 1 according to the present embodiment includes the image forming portion, the reading portion, and the control portion as essential components in order to execute the reserved job, for which presence/absence of the real adjustment function is designated by the user.

The image forming portion corresponds to the image forming portion 40, and forms the pattern image P for image quality adjustment in the marginal part Y other than the image forming region X of the recording medium S. The reading portion corresponds to the first density sensor 301 and the second density sensor 302 of the density detection device 3, and reads the pattern image P for image quality adjustment formed on the recording medium S. The control portion corresponds to the control portion 100, and reflects the reading result of the reading portion on the image quality adjustment, in other words, the real adjustment and, more specifically, the density adjustment and the position adjustment of the image. In the image forming method of the present invention, the image forming portion corresponds to an image forming step, the reading portion corresponds to a reading step, and the control portion corresponds to a control step.

Further, the image forming apparatus 1 according to the present embodiment (or, image forming method) has a feature in which, under control of the control portion 100, more specifically, under control of the CPU 101, an execution order of jobs can be determined (changed) depending on presence/absence of the real adjustment set for each job by the user.

As described above, when the reserved job to which presence/absence of the real adjustment (image quality adjustment) is designated is executed, the execution order of jobs is determined depending on presence/absence of setting of the real adjustment. Thus, even when the jobs including no real adjustment continue, the job including the real adjustment can be executed within a designated range set in a job unit or the number-of-sheets unit as a predetermined period. Then, the job including the real adjustment is executed within the designated range so as to avoid a problem in which the real adjustment is not performed over a long period to cause deterioration of the image quality of the image formed based on the latter jobs. As a result, the deterioration of the image quality can be prevented without performing the real adjustment forcibly.

Hereinafter, under control of the CPU 101, embodiment in which the execution order of jobs is determined depending on presence/absence of the real adjustment set for each job by the user will be described.

Note that, when the execution order of jobs is determined (changed), the user can designate the range (designated range) in which the real adjustment is performed, as the predetermined period, in [job unit], [number-of-sheets unit], and [no range designated] in the operation display portion 105 (refer to FIG. 1). The user further, in the operation display portion 105, can set [execution order can be changed] or [execution order cannot be changed] for the job to be input.

The real adjustment includes the position adjustment and the density adjustment. The position adjustment performs adjustment of the position only. The density adjustment performs both adjustments of the position and the density. In the operation display portion 105, the user can select either of the position adjustment and the density adjustment as material with which the CPU 101 (control portion 100) determines whether "the real adjustment is included." Then, when the positional adjustment or the density adjustment is performed on the reserved job, the CPU 101 determines the job as "real adjustment is included".

Embodiment 1

Embodiment 1 is an example in which the execution order of jobs is changed to perform the real adjustment within the designated range. In Embodiment 1, the job unit is used for the designated range. In Embodiment 1, the user selects [job unit], or [range not designated] to designate the range in which the real adjustment is performed.

FIG. 5 illustrates the change of the execution order of jobs according to Embodiment 1. Embodiment 1 describes an example where the designation range of the job unit is set to four jobs, in other words, the real adjustment is performed within the four jobs, for example. Specifically, for example, in six jobs of JOB-A to JOB-F, when the real adjustment OFF (not included) is set for the four continuous jobs of JOB-A to JOB-D, and the real adjustment ON (included) is set for two jobs of subsequent JOB-E and JOB-F, the real adjustment is not performed within the designated range (four jobs), and the deterioration of the image quality may be caused in the latter jobs.

Therefore, in the embodiment, the execution order of jobs is changed to perform the real adjustment within the designated range (four jobs). Specifically, the execution order of JOB-E set as the real adjustment ON is changed into an order (in the embodiment, fourth) within the designated range. In this case, the execution order of JOB-F set as the real adjustment ON remains as it is.

Note that, when there is no job of the real adjustment ON within a predetermined range (job unit), the job continues to be executed as it is. Then, at a time when the job of the real adjustment ON is found within the predetermined range, the execution order of jobs is changed to execute the job with highest priority.

Embodiment 2

Embodiment 2 is a modification example of Embodiment 1. In Embodiment 2, the number of sheets is used as a unit for the designated range. In the case of Embodiment 2, the user selects [number-of-sheets unit] or [no range designated] in the operation display portion 105 (refer to FIG. 1) to designate the range in which the real adjustment is performed.

FIG. 6 illustrates the change of the execution order of jobs according to Embodiment 2. Embodiment 2 describes an example where the designated range of the number-of-sheets unit is set to 150 sheets, in other words, the real adjustment is performed within 150 sheets, for example. The real adjustment OFF is set for the four continuous jobs of JOB-A to JOB-D, and the real adjustment ON is set for the subsequent two jobs of JOB-E and JOB-F. Further, the number of sheets set for each job is, JOB-A=100, JOB-B=60, JOB-C=70, JOB-D=50, JOB-E=100, JOB-F=50.

In the case of the embodiment, the number of sheets exceeds the designated range (150) at a time when JOB-B is executed. Then, in the embodiment, the execution order of JOB-E of the real adjustment ON is changed to be the second in order to perform the real adjustment within the designated range. However, when only the execution order of JOB-E is changed, subsequently, at a time when JOB-D is executed, the number of sheets exceeds the designated range again. Therefore, in the embodiment, the execution order of JOB-F of the real adjustment ON is further changed to be the fifth which is within the designated range.

Note that, in the embodiment also, when there is no job of the real adjustment ON within the predetermined range (number-of-sheets unit), the job continues to be executed as it is. At a time when the job of the real adjustment ON is found within the predetermined range, the execution order of jobs is changed to execute the job with highest priority.

Embodiment 3

Embodiment 3 is a modification example of Embodiment 1, and an example in the case where the user designates [no range designated]. In Embodiment 3, even if [no range designated] is designated, when the jobs including no real adjustment continue over the designated range (e.g., four jobs), the execution order of jobs is changed to execute the job including the real adjustment preferentially.

FIG. 7 illustrates the change of the execution order of jobs according to Embodiment 3. Herein, a case where, before the JOB-A is input, three jobs or more including no real adjustment continue is described. In the case, the real adjustment becomes necessary instantly. Thus, in the embodiment, in order to perform the real adjustment within the designated range, the execution order of the JOB-E of the real adjustment ON is changed to be the first. However, when only the execution order of JOB-E is changed, subsequently, at a time when JOB-D is executed, the number of jobs exceeds the designated range again. Therefore, in the embodiment, the execution order of the JOB-F of the real adjustment ON is further changed to be the fifth which is within the designated range.

In Embodiment 3, the modification example of Embodiment 1 in which the designated range is set in a job unit is described. However, in the modification example of Embodiment 2 in which the designated range is set in the number-of-sheets unit, basically, similar change processing of the execution order may be performed.

As described above, in Embodiment 1 to Embodiment 3, when there is no job including the real adjustment within the designated range set by a job unit or the number-of-sheets unit, the real adjustment is forcibly performed within the designated range. As described above, the job including the real adjustment is executed within the designated range so that the image quality can be recovered that is deteriorated by impact of fluctuation of the environmental conditions including temperature, humidity, and the like, and a change of durability.

Embodiment 4

Embodiment 4 describes an example where, when the jobs including the real adjustment continue, only one job including no real adjustment is inserted between continuous jobs.

Figure 8:
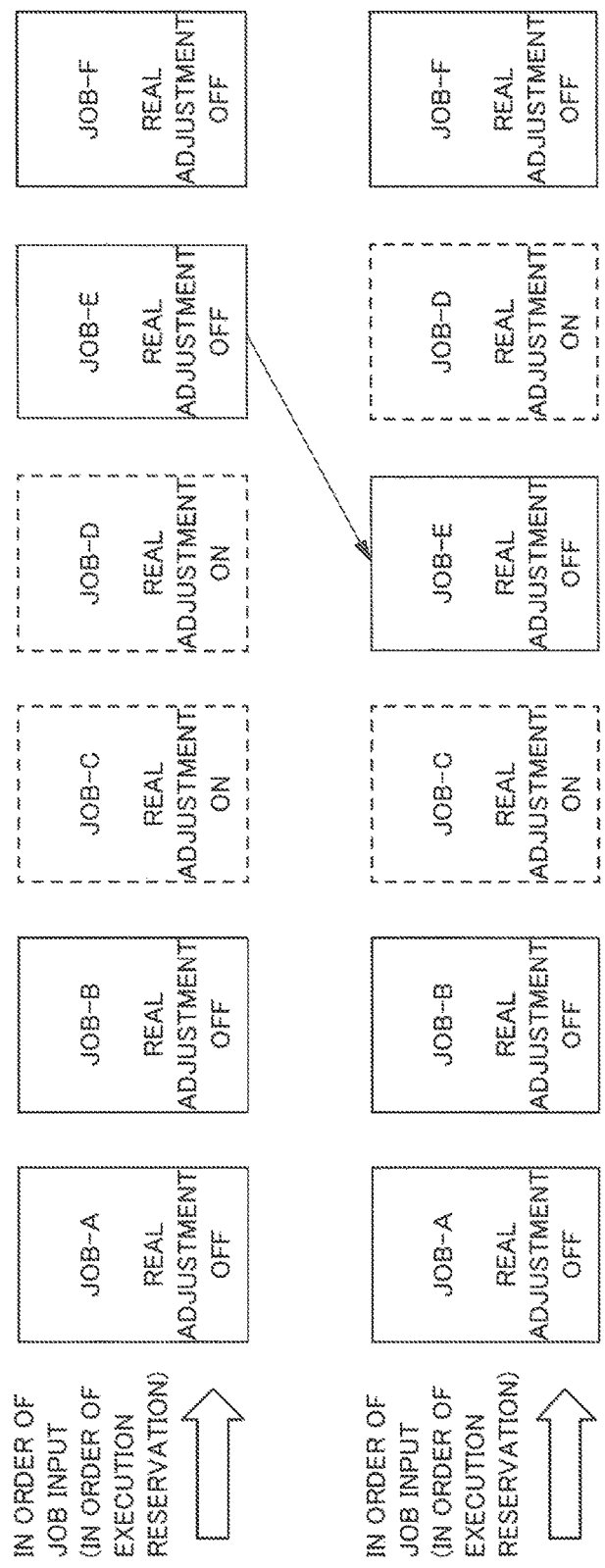
FIG. 8 illustrates a change of an execution order of jobs according to Embodiment 4.

FIG. 8 illustrates a change of the execution order of jobs according to Embodiment 4. Herein an example where the real adjustment is performed within three jobs is described. When both the third JOB-C and the fourth JOB-D in a job input order are the job of the real adjustment ON, JOB-E of the real adjustment OFF is inserted between JOB-C and JOB-D.

Embodiment 5

Embodiment 5 is a modification example of Embodiment 4, and describes an example where, when the jobs including the real adjustment continue, the maximum number of jobs including no real adjustment are inserted between continuous jobs.

Figure 9:
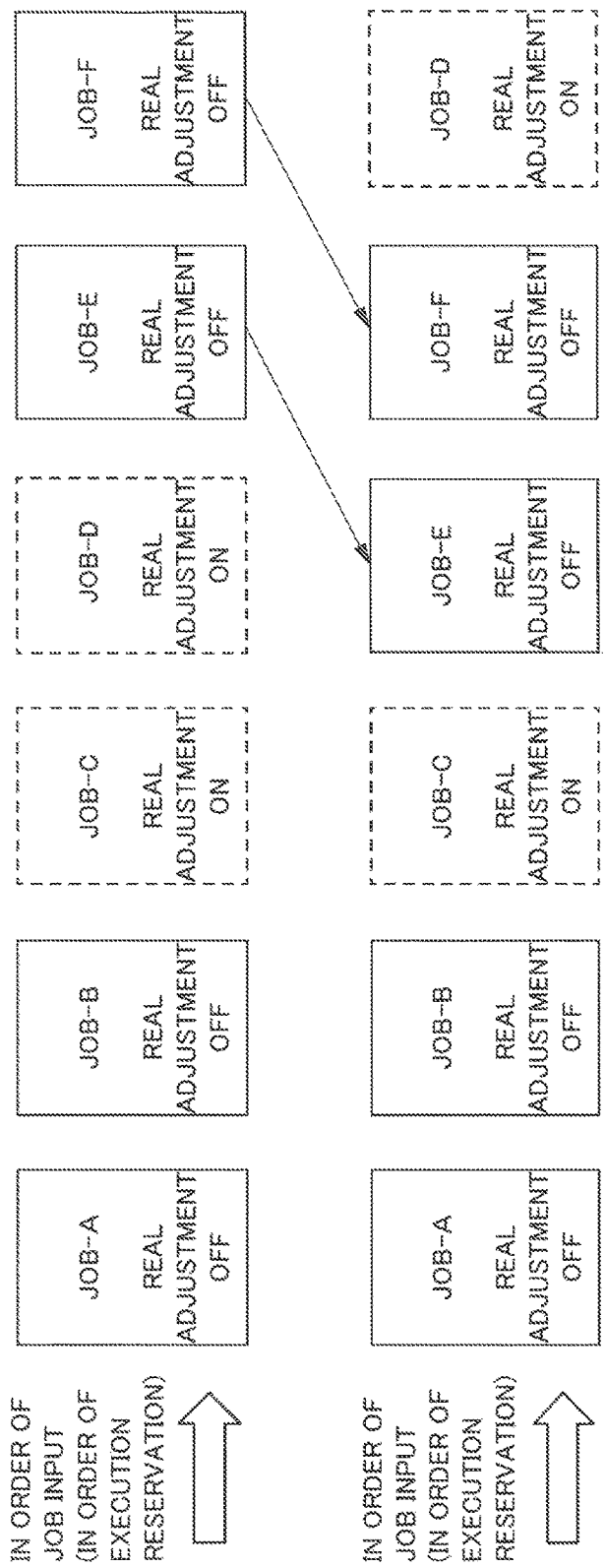
FIG. 9 illustrates a change of an execution order of jobs according to Embodiment 5.

FIG. 9 illustrates a change of the execution order of jobs according to Embodiment 5. Herein, the real adjustment is performed within three jobs. When the real adjustment is performed within the three jobs, the maximum number of the jobs including no real adjustment that can be inserted between the continuous jobs is two. Thus, when both the third JOB-C and the fourth JOB-D in a job input order are the jobs of the real adjustment ON, JOB-E and JOB-F (two jobs) of the real adjustment OFF are inserted between JOB-C and JOB-D.

Embodiment 6

Embodiment 6 is a modification example of Embodiment 4, and describes an example where the user designates [range not designated], and the jobs including the real adjustment continue.

Figure 10:
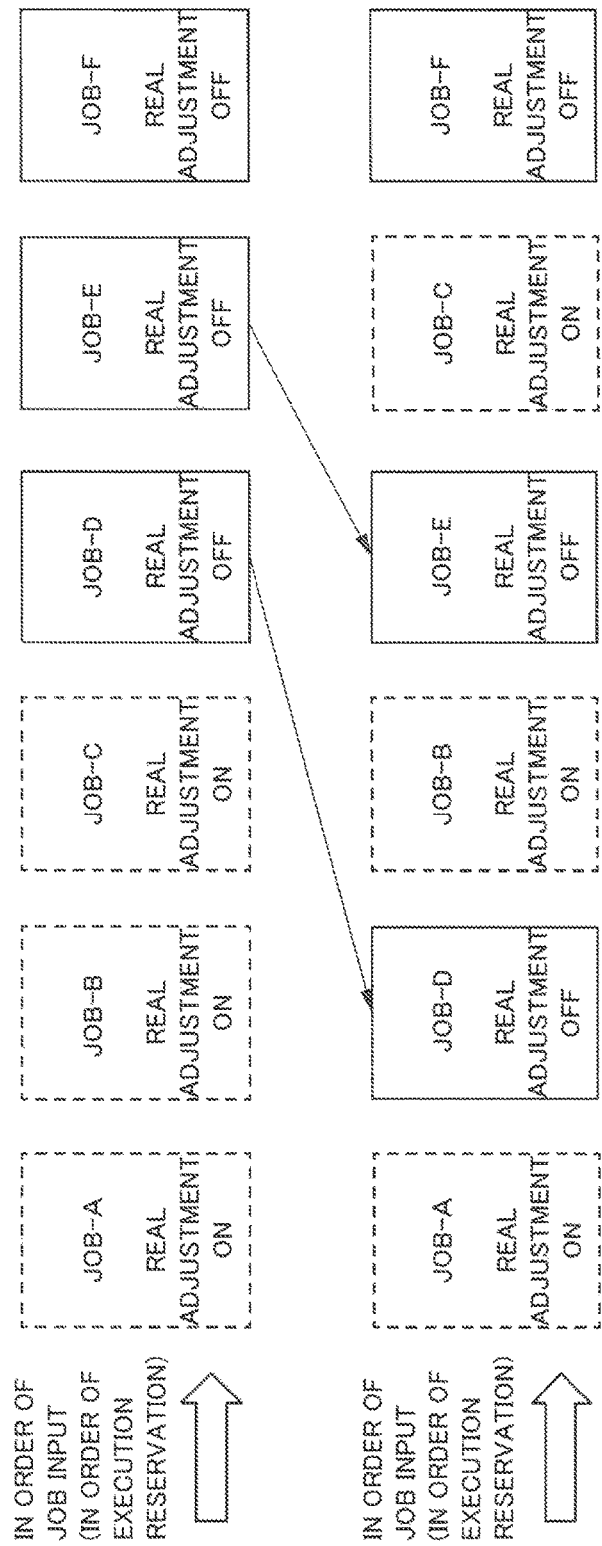
FIG. 10 illustrates a change of an execution order of jobs according to Embodiment 6.

FIG. 10 illustrates a change of the execution order of jobs according to Embodiment 6. In the case of Embodiment 6 also, in a similar manner to Embodiment 4, only one job including no real adjustment is inserted between the continuous jobs. Herein, as illustrated in FIG. 10, a case will be described specifically where the jobs of the real adjustment ON continue from the first JOB-A to the third JOB-C in the job input order. In this case, between the first JOB-A and the second JOB-B, the fourth JOB-D of real adjustment OFF is inserted. Between the second JOB-B and the third JOB-C, the fifth JOB-E of the real adjustment OFF is inserted.

As described above, in Embodiments 4 to 6, when the jobs including the real adjustment continue, the job including no real adjustment is inserted between the continuous jobs. With this arrangement, since the jobs including no real adjustment can be avoided to continue as much as possible, the deterioration of the image quality due to impact of the fluctuation of the environmental conditions including the temperature, the humidity, and the like, and the change of durability can be also avoided.

Embodiment 7

Embodiment 7 describes an example where, when there is a job whose execution order cannot be changed (job which cannot be rearranged), and timing of performing the real adjustment (periodical timing of real adjustment) is overlapped with timing of performing the job whose execution order cannot be changed, the job including the real adjustment is inserted in front of the job whose execution order cannot be changed.

Figure 11:
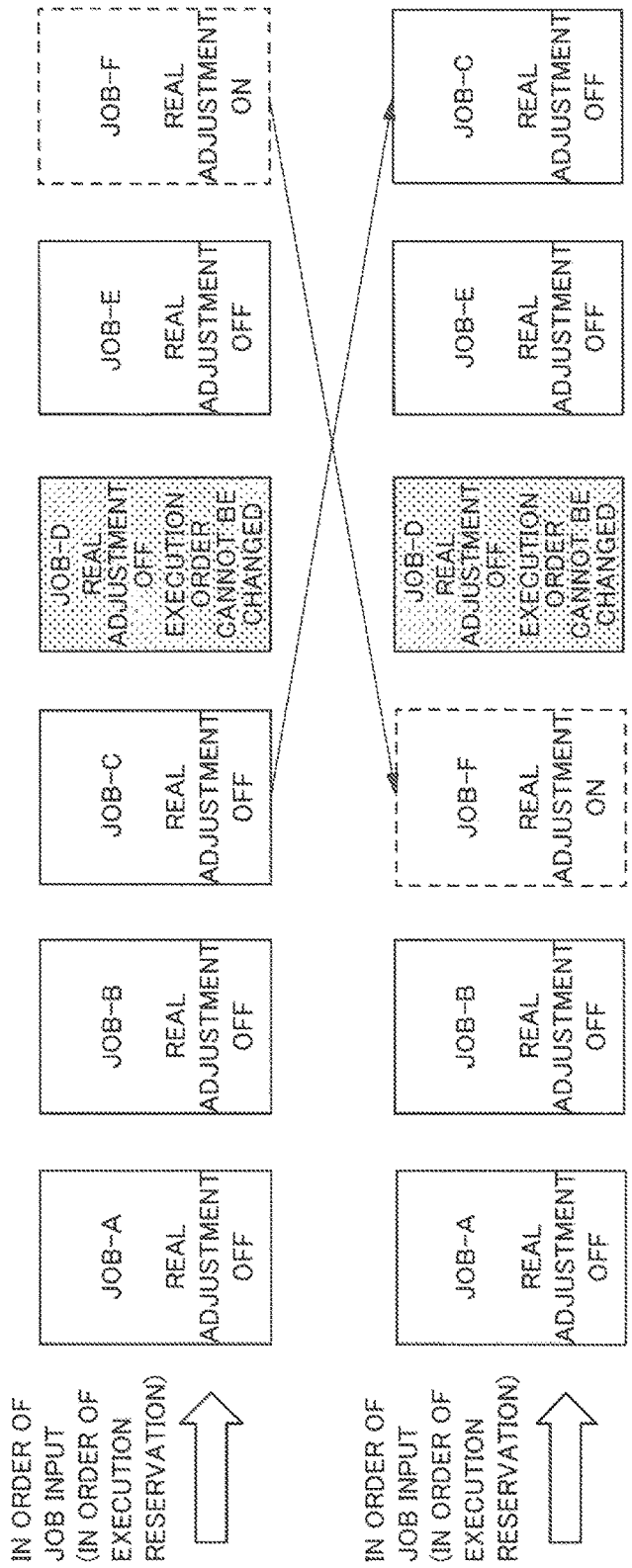
FIG. 11 illustrates a change of an execution order of jobs according to Embodiment 7.

FIG. 11 illustrates a change of the execution order of jobs according to Embodiment 7. Herein, an example will be described where the real adjustment is performed within four jobs, and also the fourth JOB-D in the job input order is the job whose execution order cannot be changed. In this case, since the timing for performing the real adjustment is overlapped with (correspond to) the timing for performing JOB-D whose execution order cannot be changed, JOB-F of the real adjustment ON is moved to insert JOB-F in front of JOB-D. When the job is moved, in order not to change the execution order when JOB-D whose execution order cannot be changed is input, the execution order of JOB-C in front of JOB-D whose execution order cannot be changed is exchanged with the execution order of JOB-F of the real adjustment ON.

Embodiment 8

Embodiment 8 describes an example where, when there is a job whose execution order cannot be changed, and the timing for performing the real adjustment (periodical timing of real adjustment) is overlapped with the timing for performing the job whose execution order cannot be changed, the job including the real adjustment is inserted at a back of the job whose execution order cannot be changed.

Figure 12:
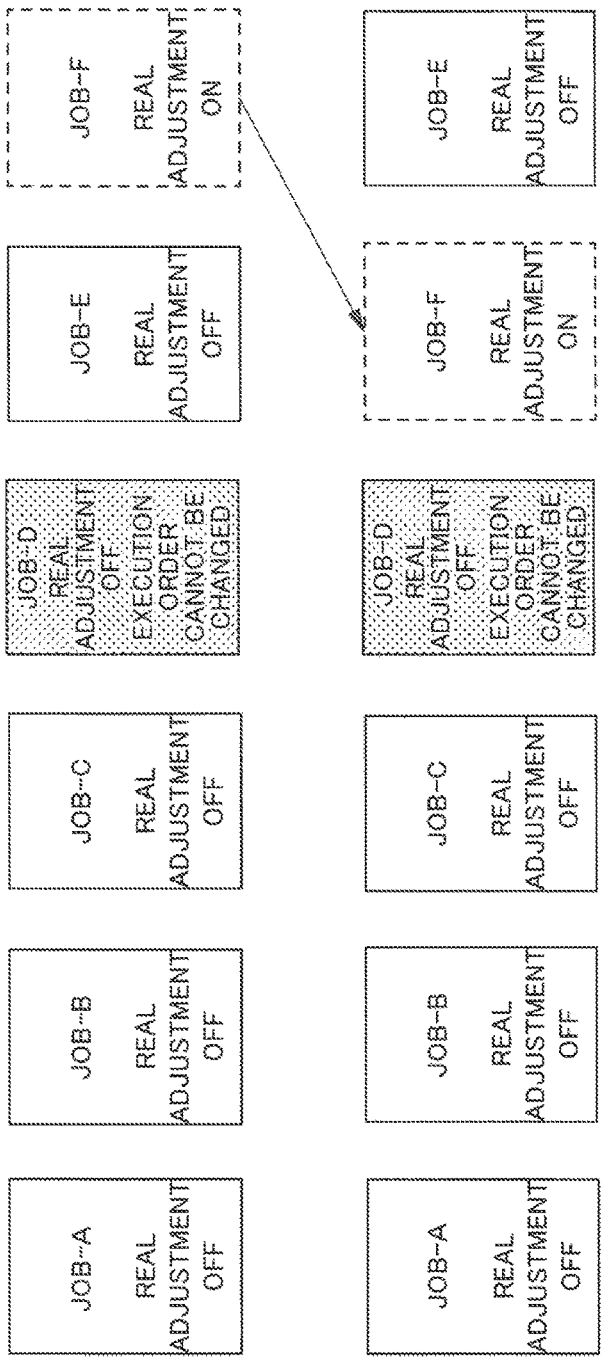
FIG. 12 illustrates a change of an execution order of jobs according to Embodiment 8.

FIG. 12 illustrates a change of the execution order of jobs according to Embodiment 8. In a similar manner to Embodiment 7, the present embodiment also describes an example where the real adjustment is performed within the four jobs and, further, the fourth JOB-D in the input order of the job is the job whose execution order cannot be changed. In this case, since the timing for performing the real adjustment is overlapped with the timing for performing JOB-D whose execution order cannot be changed, JOB-F of the real adjustment ON is moved to insert JOB-F at a back of JOB-D.

JOB-F of the real adjustment ON is inserted at the back of JOB-D, therefore, even the execution order of the job is not exchanged unlike Embodiment 7, the execution order of JOB-D whose execution order cannot be changed when being input is not changed. The user can select by designating whether the job including real adjustment is inserted in front of the job whose execution order cannot be changed like Embodiment 7 or the job including real adjustment is inserted at the back of the job whose execution order cannot be changed like Embodiment 8.

As described above, Embodiments 1 to 3 describe examples where the execution order of the job is changed to perform the real adjustment within the designated range. Embodiments 4 to 6 describe examples where, when the jobs including the real adjustment continue, the job including no real adjustment is inserted between the continuous jobs. Embodiments 7 and 8 describe examples where, when there is the job whose execution order cannot be changed, and the timing for performing the real adjustment is overlapped with the timing for performing the job whose execution order cannot be changed, the job including the real adjustment is inserted in front of or at the back of the job whose execution order cannot be changed.

In any case of Embodiments 1 to 8, the execution order of jobs is determined (changed) corresponding to setting of the real adjustment ON/OFF so that the real adjustment can be performed within the designated range. With this arrangement, even if the job including no real adjustment continue when a reserved job is executed, the job including the real adjustment can be performed within the designated range set by job unit or the number-of-sheets unit. Then, the job including the real adjustment is executed within the designated range. Therefore, a problem can be prevented in which the image quality adjustment is not performed for a long period and thus the image quality of the image formed based on the latter job is deteriorated.

[Determination Control of Execution Order of Jobs]

Subsequently, determination control of the execution order of jobs according to Embodiments 1 to 8 will be described specifically. The determination control of the execution order is executed under control of the CPU 101 of the control portion 100 in the image forming apparatus 1 illustrated in FIG. 3.

When the execution order of jobs is determined, the designated range in which the real adjustment is performed is set by job unit (or the number-of-sheets unit) by the user in advance. Further, the designated range is determined based on a count value of a counter that determines the designated range (not illustrated) included in the control portion 100. The count value of the counter is reset when the job including the real adjustment is executed.

Control Example 1

Figure 13:
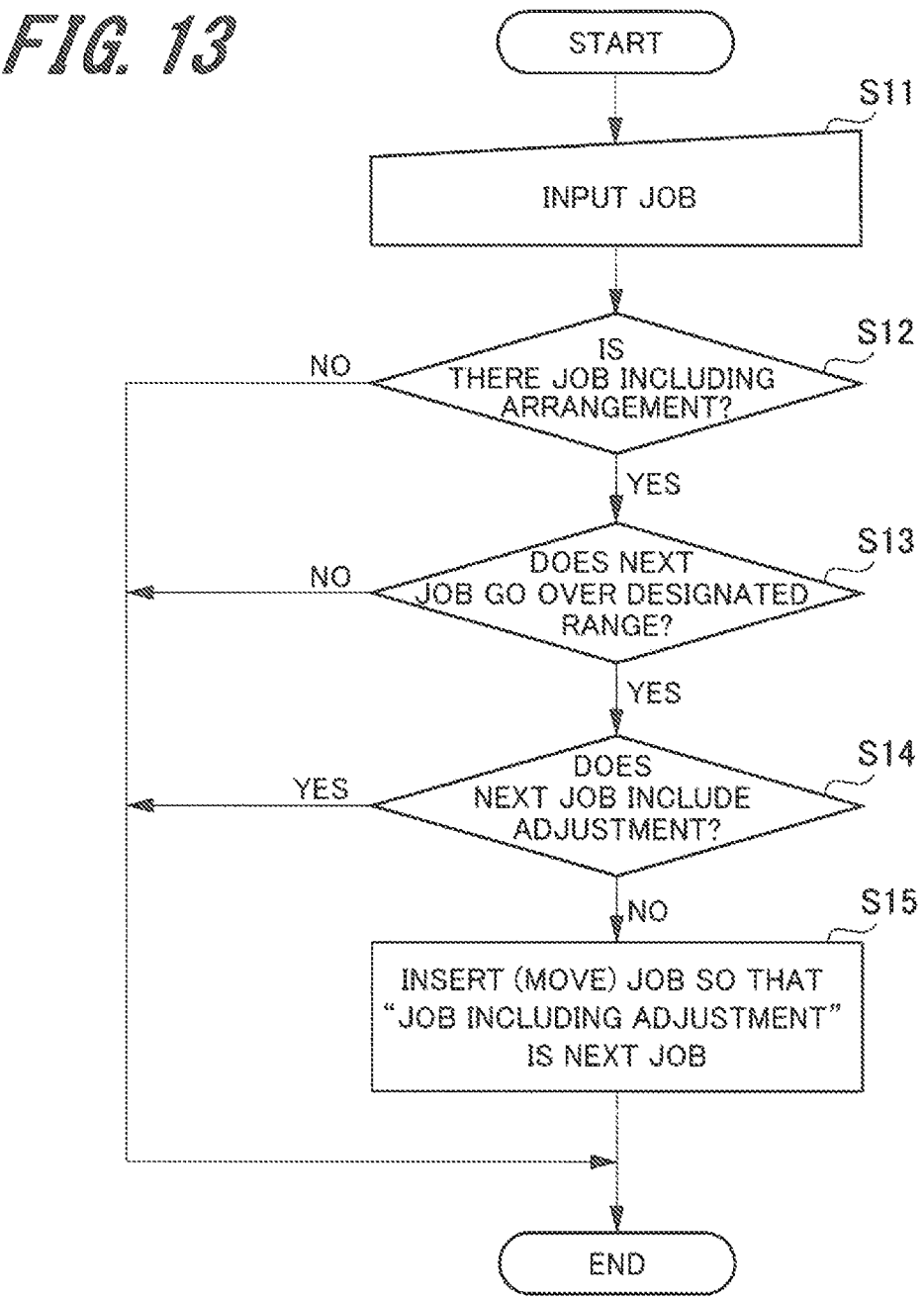
FIG. 13 is a flowchart illustrating a processing flow according to a control example 1.

The control example 1 is an example of basic control for determining the execution order of jobs. The control example 1 describes control when the execution orders of jobs in Embodiments 1 to 5, 7, and 8 described above are determined. Processing flow according to the control example 1 is illustrated in FIG. 13.

When the user inputs the job to which presence/absence of the real adjustment is designated (step S11), the CPU 101 of the control portion 100 determines whether or not there is the job including the real adjustment in the reserved jobs (step S12). When there is no job including the real adjustment (NO in S12), processing for the control is ended. When there is the job including the real adjustment in the reserved jobs (YES in S12), the CPU 101 determines whether or not the job to be executed next is the job to be executed over the designated range (step S13). When the job is not to be executed over the designated range (NO in S13), the processing for the control is ended. Note that determination on whether or not the job to be executed next is the job to be executed over the designated range is performed based on the count value of the counter that determines the designated range.

When the job to be executed next is the job to be executed over the designated range (YES in S13), the CPU 101 determines whether or not the job to be executed next is the job including the real adjustment (step S14). When it is the job including the real adjustment (YES in S14), since the real adjustment is performed in the job to be executed next, the processing for the control is ended. When the job to be executed next is not the job including no real adjustment (NO in S14), the CPU 101 moves the job so that the next job is the "job including the real adjustment" (step S15). Subsequently, a series of processing for the control is ended.

Control Example 2

The control example 2 describes an example where control is performed for determining the execution order of jobs according to Embodiment 6 described above. FIG. 14 illustrates a processing flow according to the control example 2. Embodiment 6 describes an example where the user designates [range not designated], and the jobs including the real adjustment continue.

The user inputs the job to which presence/absence of the real adjustment is set (step S21), and the CPU 101 determines whether or not the designated range in which the real adjustment is performed is set (step S22). When the designated range is set (YES in S22), the processing proceeds to step S23. The processing in step S23 is the processing in steps S12 to S15 illustrated in FIG. 13, that is, the processing of a basic processing routine that determines the execution order of jobs.

When the designated range is not set (NO in S22), the CPU 101 determines whether or not there is the job including real adjustment in the reserved jobs (step S24). When there is no job including the real adjustment (NO in S24), the processing for the control is ended. When there is the job including the real adjustment in the reserved jobs (YES in S24), the CPU 101 determines whether or not the jobs including the real adjustment continue (step S25). When the jobs including the real adjustment do not continue (NO in S25), the processing for the control is ended.

When the jobs including the real adjustment continue (YES in S25), the CPU 101 determines whether or not there is the job including no real adjustment at the back of the continuous jobs including the real adjustment (step S26). When there is no job including no real adjustment (NO in S26), the processing for the control is ended. When there is the job including the real adjustment (YES in S26), the CPU 101 inserts (moves) the "job including no real adjustment" between the continuous jobs including the real adjustment (step S27). Subsequently, a series of processing for the control is ended.

With the series of processing described above, when the user designates [region not designated] as the designation of the designated region, the execution order of jobs is changed only when the jobs including the real adjustment continue.

Control Example 3

The control example 3 describes control for determining the execution order of jobs when there is the job whose execution order cannot be changed. FIGS. 15 and 16 illustrate processing flows according to the control example 3.

First, in the flowchart illustrated in FIG. 15, the user inputs the job to which presence/absence of the real adjustment is designated (step S31). The CPU 101 determines whether or not there is the job whose execution order cannot be changed in the reserved jobs (step S32). When there is no job whose execution order cannot be changed (NO in S32), the processing proceeds to step S33. The processing in step S33 is the processing in steps S22 to S27 illustrated in FIG. 14, more specifically, processing of a processing routine by whether the designated range is set.

When there is a job whose execution order cannot be changed in the reserved jobs (YES in S32), the CPU 101 determines whether or not there is the job including the real adjustment whose execution order can be changed in the reserved jobs (step S34). If there is no job including the real adjustment whose execution order can be changed (NO in S34), since the change of the execution order is not necessary, the processing of the control is ended. If there is the job including the real adjustment whose execution order can be changed (YES in S34) in the reserved jobs, the CPU 101 determines whether or not the job to be executed next is the job to be executed over the designated range (step S35).

Then, when the job to be executed next is the job to be executed over the designated range (YES in S35), the CPU 101 determines whether or not the next job is the job including the real adjustment (step S36). If the next job does not include the real adjustment (NO in S36), since the change of the execution order is not necessary, the processing for the control is ended. If the job includes the real adjustment (YES in S36), the CPU 101 determines whether or not the next job is the job whose execution order can be changed (job whose order can be changed) (step S37). If the execution order of the job cannot be changed (NO in S37), since the change of the execution order is not necessary, the processing for the control is ended.

If the job to be executed next is the job whose execution order can be changed (YES in S37), the CPU 101 exchanges the execution orders between the "job including the real adjustment whose execution order can be changed" and the "job to be executed next" (step S38). In other words, since there is the job whose execution order cannot be changed and, further, the execution order of the job to be executed next can be changed, there is always the job whose execution order cannot be changed latter than the job to be executed next. Therefore, a change method of the execution order is not to be inserted (moved), but to be exchanged.

In step S35, when the job to be executed next is not the job to be executed over the designated range (NO in S35), the CPU 101 proceeds to the processing of the flowchart illustrated in FIG. 16. In the flowchart illustrated in FIG. 16, then, the CPU 101 determines whether or not the job to be executed after next (two jobs ahead) is the job to be executed over the designated range (step S39). If the job is not the job to be executed over the designated range (NO in S39), since the change of the execution order is not necessary, the processing for the control is ended.

When the job after the next job (job two jobs ahead) is the job to be executed over the designated range (YES in S39), the CPU 101 determines whether or not the next job is the job including the real adjustment (step S40). If the next job includes the real adjustment (YES in S40), since the change of the execution order is not necessary, the processing for the control is ended. If the next job does not include the real adjustment (NO in S40), the CPU 101 determines whether or not the job after the next job is the job including the real adjustment (step S41). If the job after the next job is the job including the real adjustment (YES in S41), since the change of the execution order is not necessary, the processing for the control is ended.

If the job after the next job does not include the real adjustment (NO in S41), the CPU 101 determines whether or not the job after the next job is the job whose execution order can be changed (step S42). Then, if the execution order of the job after the next job cannot be changed (NO in S42), the CPU 101 determines whether or not the next job is the job whose execution order can be changed (step S43). If the execution order of the job after the next job cannot be changed (NO in S43), since the execution order of the job after the next job does not need to be changed, the processing for the control is ended.

If the execution order of the next job can be changed (YES in S43), the CPU 101 determines whether or not the job including the real adjustment can be inserted in front of the job whose execution order cannot be changed (step S44). The determination in step S44 is performed to determine whether the job including the real adjustment is inserted "in front of" or "at the back of" the job whose execution order cannot be changed, when the timing for performing the real adjustment is overlapped with the timing for executing the job whose execution order cannot be changed. The determination of selection is performed based on the user's designation.

When the job including the real adjustment is inserted in front of the job whose execution order cannot be changed (YES in S44), the CPU 101 exchanges the execution orders between the "job including the real adjustment whose execution order can be changed" and the "job to be executed next" (step S45). When the job including the real adjustment is not inserted in front of the job whose order cannot be changed (NO in S44), since the change of the execution order is not necessary, the CPU 101 ends the processing for the control.

In step S42, if the execution order of the job after the next job can be changed (YES in S42), the CPU 101 determines whether or not there is the job whose execution order cannot be changed latter than the job after the next job (step S46). Then, if there is the job whose execution order cannot be changed latter than the job after the next job (YES in S46), the CPU 101 exchanges the execution orders between the "job including the real adjustment whose execution order can be changed" and the "job to be executed after next" (step S47).

Further, if there is no job whose execution order cannot be changed latter than the job after the next job (NO in S46), the CPU 101 inserts (moves) the "job including the real adjustment whose execution order can be changed" between the next job and the job after the next job so that the "job including the real adjustment whose execution order can be changed" is the "job to be executed after next" (step S48). As described above, a series of processing for the control is ended.

Modification Example

As described above, with reference to the embodiments according to the present invention, the present invention is not limited to the scope described in the above embodiments. That is, various modifications and improvements can be added to the above described embodiments without departing from the spirit or scope of the present invention. Thus, it is intended that the technical scope of the present invention covers the modifications and improvements.

For example, the above described present embodiment describes a copy machine as the image forming apparatus 1 according to the embodiment of the present invention, however, the present invention is not limited thereto. More specifically, the present invention can be applied to the entire image forming apparatuses of the electrophotographic system including printer apparatuses, facsimile apparatuses, printers, complex machines, in addition to the copy machines.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image forming apparatus comprising:
   an image forming portion configured to form a pattern image for image quality adjustment in a marginal part other than an image forming region of a recording medium;
   a reading portion configured to read the pattern image for the image quality adjustment formed on the recording medium; and
   a control portion configured to (i) reflect a reading result by the reading portion on the image quality adjustment, (ii) change an execution order of a plurality of jobs according to presence/absence of the image quality adjustment set for each job so that the image quality adjustment is executed within a predetermined period, and (iii) execute the plurality of jobs in the changed execution order.

2. The image forming apparatus according to claim 1, wherein the control portion preferentially executes, when jobs without the image quality adjustment continue in the predetermined period, a job with the image quality adjustment from among the the plurality of jobs.

3. The image forming apparatus according to claim 2, wherein the control portion forcibly executes the image quality adjustment, when there is no job with the image quality adjustment among the the plurality of jobs.

4. The image forming apparatus according to claim 2, wherein the control unit executes, when jobs with the image quality adjustment continue in the the plurality of jobs, a job without the image quality adjustment between continuous jobs with the image quality adjustment.

5. The image forming apparatus according to claim 1, wherein the predetermined period can be designated by a user.

6. The image forming apparatus according to claim 1, wherein the control portion can select adjustment of a position, or adjustment of both a position and a density, as the image quality adjustment.

7. An image forming apparatus comprising:
   an image forming portion configured to form a pattern image for image quality adjustment in a marginal part other than an image forming region of a recording medium;
   a reading portion configured to read the pattern image for the image quality adjustment formed on the recording medium; and
   a control portion configured to (i) reflect a reading result by the reading portion on the image quality adjustment, (ii) determine an execution order of a plurality of jobs according to presence/absence of the image quality adjustment set for each job, and (iii) execute a job for which the presence/absence of the image quality adjustment is designated,
   wherein the the plurality of jobs include a job that can be rearranged in the execution order and a job that cannot be rearranged in the execution order.

8. The image forming apparatus according to claim 7, wherein the control portion rearranges the execution order of jobs only for the job that can be rearranged.

9. The image forming apparatus according to claim 7, wherein the control portion sets the job that cannot be rearranged as a job that is not a target of rearrangement of the execution order of jobs, and executes the job in an order in which the job is input.

10. The image forming apparatus according to claim 7, wherein the control portion inserts, when a timing for executing the image quality adjustment coincides with an execution timing of the job that cannot be rearranged, the job that can be rearranged in front of the job that cannot be rearranged, and then executes the image quality adjustment.

11. The image forming apparatus according to claim 7, wherein the control portion inserts, when a timing for executing the image quality adjustment coincides with an execution timing of the job that cannot be rearranged, the job that can be rearranged after the job that cannot be rearranged, and then executes the image quality adjustment.

12. An image forming method comprising:
   forming a pattern image for image quality adjustment in a marginal part other than an image forming region of a recording medium;
   reading the pattern image for the image quality adjustment formed on the recording medium;
   reflecting a reading result of the pattern image for the image quality adjustment to the image quality adjustment;
   changing an execution order of a plurality of jobs according to presence/absence of the image quality adjustment set for each job so that the image quality adjustment is executed within a predetermined period, and
   executing the plurality of jobs in the changed execution order.

* * * * *